3,373,229
VINYL POLYMER COMPOSITIONS

David Joseph Philpot, Stockton-on-Tees, England, and David Victor Wise, Sarnia, Ontario, Canada, assignors to Imperial Chemical Industries Limited, London, England, a corporation of Great Britain
No Drawing. Continuation-in-part of application Ser. No. 297,688, July 25, 1963. This application Jan. 10, 1966, Ser. No. 519,457
Claims priority, application Great Britain, Aug. 1, 1962, 29,568/62
8 Claims. (Cl. 260—899)

ABSTRACT OF THE DISCLOSURE

There is provided a rigid polyvinyl chloride composition containing high molecular weight polymers of methyl methacrylate, or copolymers of methyl methacrylate with a small amount of an alkyl acrylate, as processing aids. The methyl methacrylate polymers or copolymers have a reduced specific viscosity (measured on at 0.1% solution in chloroform at 20° C.) of at least 4.5.

---

This application is a continuation-in-part of U.S. application Ser. No. 297,688, filed July 25, 1963, now abandoned.

The present invention relates to vinyl polymer compositions and more particularly to compositions comprising polymers of vinyl chloride which may be worked to give shaped products with good surface finish.

Vinyl chloride polymers are attractive thermoplastic materials from which to manufacture shaped articles as they have good physical properties, are inert to a large number of chemicals, are weather resistant and flame proof. However, in unplasticized form vinyl chloride polymers may be shaped in moulding and extrusion processes only with difficulty and tend to give products having a poor surface finish. The quality of the products is also very susceptible to changes in moulding or extruding conditions. Vinyl chloride polymers are also extensively used in conjunction with plasticizers to form plasticized compositions. The addition of plasticizer to vinyl chloride polymers brings about several changes in the nature of the composition. Firstly, as the concentration of plasticizer increases, the flexibility of the composition increases. A convenient method for assessing flexibility is by measurement of the tensile modulus of a sample of the composition under standard conditions, for example at 20° C. at a strain of 0.2% and after being subjected to the load for 100 seconds. The tensile modulus under the above conditions for vinyl chloride polymer compositions containing no plasticizer is about 430,000 lb./sq. inch and as the plasticizer content increases, the tensile modulus initially falls slowly. As the plasticizer content is increased above about 17% by weight of the composition, the tensile modulus falls rapidly, finally levelling off at a value of a few hundred lb./sq. inch when the plasticizer concentration is about 40% by weight of the composition. Of course, the precise values of the tensile modulus at any plasticizer concentration will depend on both the nature of the vinyl chloride polymer and on the nature of the plasticizer. The change from the rigid to the flexible state is somewhat arbitrary but a convenient definition of "rigid" is that the composition has a tensile modulus of greater than 200,000 lb./sq. inch. With this definition, the transition from rigid to flexible occurs at a plasticizer content of from about 15 to 25% by weight of the composition. Flexible compositions cannot be used for many applications for example, self supporting pipes, guttering and sheet applications.

The addition of about 8 to 10% by weight of the composition of plasticizer, while giving rigid compositions, results in compositions of lower impact strength than compositions containing no plasticizer. The compositions also have a lower softening point than compositions containing no plasticizer.

Compositions containing up to 5% by weight of plasticizer are rigid and have an impact strentgh similar to that of compositions containing no plasticizer. The softening point of such compositions is still lower than that of compositions containing no plasticizer but in some cases this lower softening point can be tolerated.

The addition of plasticizer also gives an improvement in processability, compositions containing more than about 15% by weight plasticizer being readily processed. However, compositions containing less than 5% by weight of plasticizer are nearly as difficult to process as compositions containing no plasticizer. For use as materials for manufacturing shaped articles by processes involving forming a melt of the polymer and causing said melt to flow to the desired shape followed by cooling to form a shaped article, the composition should also be free from solvents as the presence of a solvent for the vinyl chloride polymer will render the compositions sticky and hence render handling difficult. In a closed processing system, for example an extrusion or injection moulding process, the solvent would vaporise during processing at the elevated temperatures used in those processes and woold cause the generation of voids in the resultant article. It is with respect to such vinyl chloride polymer compositions containing no solvent and less than 5% by weight of plasticizer, that the present invention is concerned. For convenience we shall refer to those materials as rigid essentially unplasticized vinyl chloride polymer compositions although it will be recognized from the above that these compositions may contain a small amount of plasticizer, up to 5% by weight, since such compositions retain their rigid characteristics and are little different to compositions containing no plasticizer.

In an effort to overcome shortcomings of rigid unplasticized vinyl chloride polymers it has recently been proposed to blend these polymers with moderate amounts of acrylic polymers of low molecular weight, that is acrylic polymers having reduced specific viscosities as measured as 0.1% solutions in chloroform of about 2. However, in order to obtain the desired effect it has generally been found necessary to add more of the acrylic polymer than is acceptable in some applications, such as the manufacture of rigid pipe for drinking water. We have now found unexpectedly that if the rigid unplasticized vinyl chloride polymer is blended with an acrylic polymer having a considerably higher molecular weight, for example equivalent to a reduced specific viscosity of from at least 4.5 and up to 18 or even higher, less of the acrylic polymer is required to achieve the desired increase in processability. This is surprising as acrylic polymers of high molecular weight are generally regarded as being unworkable by the normal extrusion, injection moulding and milling processes used for rigid unplasticized vinyl chloride polymers and it would have been expected that blending these materials with rigid unplasticized vinyl chloride polymers would have an adverse effect on the processing of the resultant composition.

Thus, according to the present invention, we provide a rigid, essentially unplasticized solvent free thermoplastic polymeric composition comprising a polymer of vinyl chloride and at least 0.1% by weight of the vinyl chloride polymer, of an acrylic polymer having a reduced specific viscosity, as measured on a 0.1% solution in chloroform at 20° C., of at least 4.5, said acrylic polymer being a polymer of methyl methacrylate with from 0 to 25% molar of an alkyl acrylate in which the alkyl group contains from 1 to 10 carbon atoms, said composition containing less than 5% by weight of plasticizer.

Such compositions are basically different in properties, function and use from plasticized vinyl chloride polymer compositions containing methyl methacrylate polymers. In this connection it is noted that methyl methacrylate polymers of varying molecular weights have been incorporated into highly plasticized flexible vinyl chloride polymer compositions in the past for various reasons. The preparation of such prior compositions presents no particular difficulty since the plasticizer used is a plasticizer for the methyl methacrylate polymer as well as the vinyl chloride polymer. However, the successful incorporation of acrylic polymers into vinyl chloride polymer compositions, as proposed herein, and the usefulness of the resulting compositions are highly unexpected in view of the essential absence of plasticizer in these compositions.

The polymer of vinyl chloride used herein may be a homopolymer of vinyl chloride or a copolymer of vinyl chloride with up to 20% by weight of another copolymerisable monomer or a chlorinated polymer of vinyl chloride. The homopolymers of vinyl chloride are preferred because of their good all round properties in the applications envisaged.

Examples of alkyl acrylates that may be copolymerised with methyl methacrylate to form our specified acrylic polymers are methyl acrylate, ethyl acrylate, n-butyl acrylate and the higher homologues. In general, as the molecular weight of the comonomer increases, a greater weight of it will be required to achieve a given molar concentration of comonomer in the copolymer. In addition, there is some evidence indicating that as the molecular weight of the comonomer increases, there may be a decrease in compatibility of the copolymer with chloride polymers. Thus it is generally preferable to use the lower molecular weight acrylates, i.e. those in which the alkyl groups contain from 1 to 4 carbon atoms.

The acrylic polymer may be formed by any suitable process for the polymerisation or copolymerisation of methyl methacrylate. However, it is preferred to obtain the polymer finally in the form of small particles and since the use of a bulk polymerisation process would normally entail a further communition process to obtain small particles, it is preferred to effect the polymerisation in aqueous medium. We have also found that when the product from a granular polymerisation process is incorporated in the vinyl chloride polymer composition, fabricated articles formed from the composition frequently suffer from heterogeneity due to the presence of undispersed acrylic particles and while this effect may be reduced to some extent by increasing the alkyl acrylate content of the acrylic polymer, this can become uneconomical. We have found that this defect can be substantially reduced or avoided by forming the acrylic polymer in an emulsion polymerisation process and we prefer, therefore, to use emulsion-formed polymers.

The molecular weight of the acrylic polymer to be blended with the vinyl chloride may be controlled by any suitable means during the polymerisation process. For example, polymerisation temperature, catalyst, concentration and concentration of chain transfer agent all control the molecular weight of the polymeric product. Generally speaking, decrease in temperature, decrease in catalyst concentration and decrease in concentration of chain transfer agent all lead to increases of molecular weight. As an example, polymerisation of methyl methacrylate at 65° C. with 0.2% by weight of the monomer of potassium persulphate as catalyst and 0.1% by weight of the monomer of lauryl mercaptan as chain transfer agent gives a product with a reduced specific viscosity of about 3 while polymerisation under the same conditions but with 0.025% only of lauryl mercaptan gives a product with a reduced specific viscosity of about 6. Polymerisation in the absence of the chain transfer agent will give products of even higher reduced viscosity. The polymerisation reaction is very sensitive to the presence of oxygen and it is preferred both to purge the polymerisation vessel with an inert gas such as nitrogen and to evacuate so as to remove any oxygen dissolved in the polymerisation medium.

While any of our specified acrylic polymers having a molecular weight equivalent to a reduced specific viscosity of 4.5 or more may be used in the compositions of the invention, we prefer to use those having a reduced specific viscosity of at least 7, and preferably above 10, as the effectiveness of the polymer generally increases with increase in its molecular weight.

The acrylic polymer may be added to the vinyl chloride polymer in any suitable manner. For example, it may be added to the vinyl chloride polymerisation reaction mixture at the beginning of the polymerisation process or towards the end of the process or at any suitable intermediate point. The acrylic polymer may also be added at the drying stage. For example, it may be added in the form of a latex to the product of the vinyl chloride polymerisation and the two polymers co-dried e.g. in a spray drier. On the other hand, the two polymers in dry form may be mixed together in any suitable manner such as on a two roll mill or in a Banbury mixer or on an extruder with a mixing head.

The amount of acrylic polymer which should be mixed with the vinyl chloride polymer in order to achieve a desired effect as hereinafter described is best determined by simple experimentation. The necessary amount will depend in the reduced viscosity of the acrylic polymer, and amount of alkyl acrylate in the acrylic polymer, the choice of alkyl acrylate as the comonomer in the copolymer, the method of incorporating the acrylic polymer in the vinyl chloride polymer composition and the type of forming operation to which the composition is to be subjected. As a general rule we have found that, at least up to a reduced specific viscosity of about 18, the amount of acrylic polymer required for a given effect is reduced with increase in reduced specific viscosity. For example, the improvement in injection moulding produced by adding 3 parts of an acrylic polymer having a reduced specific viscosity of about 5 is also produced by the addition of only 1 part of an acrylic polymer having a reduced specific viscosity of about 14.

With increase in the alkyl acrylate content of the acrylic polymer, more of the acrylic polymer is required to achieve a given effect. Similarly, with increase in the molecular weight of the alkyl acrylate more of the acrylic polymer will be required in the composition. However, the presence of the comonomer generally improves the ease of dispersion of the acrylic polymer throughout the vinyl chloride polymer under normal processing conditions for the latter. For optimum conditions of dispersability and effectiveness, we prefer the copolymer to contain from 5 to 15% by weight of the acrylate.

It will be appreciated that the manner of incorporating the acrylic polymer in the vinyl chloride polymer will also have an effect on the amount required since it controls the efficacy with which the former is dispersed in the latter; the more efficient the blending, the less acrylic polymer will be needed to produce a given effect.

In general, not more than 25 parts of the acrylic resin should be used per 100 parts of vinyl chloride polymer and we have found that amounts of 5 parts or less per 100 parts are very effective for most applications. Indeed, for some applications as little as 0.1 part of an acrylic polymer having a high molecular weight may be effective and for most applications about 1 to 5 parts per 100 are sufficient.

The effect of the addition of the acrylic polymer is best demonstrated by the examination of articles fabricated from the compositions. In injection moulding for example, depending on the shapes of the articles and the designs of the moulds used to produce them, articles formed from rigid unplasticized polyvinyl chloride often show areas in which the poor surface finish is marred by the presence of dull marks, streaking, or delamination.

With the incorporation of the acrylic polymer such areas are substantially reduced in size or eliminated altogether, thus making mould design and injection conditions less critical.

In extrusion, the use of rigid unplasticized vinyl chloride polymer compositions frequently gives rise to rough or irregular surfaces and with the incorporation of the acrylic polymer improvements in the gloss may be obtained.

The shaping of rigid unplasticized vinyl chloride polymer sheet by fluid pressure or vacuum is frequently accompanied by a certain amount of surface cracking in the finished product and this undesirable effect may also be reduced or eliminated by the incorporation of small amounts of our specified acrylic polymers.

A further disadvantage normally found in the production or use of rigid unplasticized vinyl chloride polymer compositions is the sensitivity of the performance of a particular composition in forming operations to relatively small changes in the conditions under which the processing takes place and with the incorporation of the acrylic polymer it has been found that the resultant compositions are considerably more tolerant to variations in processing conditions, for example during compounding.

In general, we have found that the incorporation of from 0.1 to 5.0% by weight of our specified acrylic polymers in the vinyl chloride polymer gives good results in the majority of applications, the actual amount chosen depending upon the application for which the blend is to be used. It should be understood that the lower end of the range quoted refers to the use of acrylic polymers with a relatively high reduced viscosity and vice-versa and it should also be understood that greater or lesser amounts may be used with effect in some applications.

The addition of our specified acrylic polymers to rigid unplasticized vinyl chloride polymer compositions has also been found to improve many of their processing characteristics. For example, it improves the continuity of the rolling bank during malaxation on a mill, improves the performance of the compositions on a Banbury type of internal mixer and its calender roll release is good at lower lubricant levels than are acceptable for unmodified vinyl chloride polymer formulations. Our compositions also have a sharper gelling point and improved hot tear strength. In addition, they may show excellent compatibility and may be used in transparent mouldings.

Other additives such as fillers, pigments, heat and light stabilisers, lubricants and anti-static agents may be added to our compositions and as noted earlier, up to 5% by weight of the composition of a plasticizer may also be added if desired, since this amount of plasticizer is insufficient to change the rigid nature of the resulting product. Materials that are plasticizers for vinyl chloride polymers include the esters of polycarboxylic acids such as the phthalates; adipates; azelates; sebacates; esters of phosphoric acid; epoxidised oils; epoxy resins and chlorinated hydrocarbons.

The compositions according to the present invention may be converted into shaped articles by any suitable process involving heating the composition to elevated temperatures and applying pressure.

For example, compositions in the form of powder blends may be milled at elevated temperatures and subsequently formed into sheet by pressing or calendering. Compositions in sheet form may be vacuum formed or blown by gaseous pressure to the desired shape, for example, domes. Compositions in powder form may be extruded or injection moulded. Likewise compositions made by mixing the vinyl chloride polymer and acrylic polymer at elevated temperatures, for example on a mill, in a Banbury type of internal mixer or by extrusion may subsequently be comminuted and used for extrusion, injection moulding or blow moulding.

The compositions are particularly useful in the fabrication of rigid structures such as pipes, pipe fittings, ducts such as rain water gutters, channels, bowls, domes, plates, sheets and the like.

Our invention is illustrated in the following examples in which all parts are expressed as parts by weight.

EXAMPLE 1

Preparation of acrylic polymer 70 parts of water, 27 parts of methyl methacrylate and 3 parts of ethyl acrylate were charged into an autoclave together with 0.45 part of sodium dioctyl sulphosuccinate as emulsifying agent and 0.06 part of potassium persulphate as catalyst. The charge was purged with nitrogen while being subjected to continuous stirring and then heated to 50° C. The reaction peaked after 90 minutes and the temperature was then raised to 80° C. for 10 minutes to complete the polymerisation. The latex was cooled and spray-dried to give 29.4 parts of a copolymer containing 10% by weight (8.9 mole percent) or ethyl acrylate and having a reduced specific viscosity, as measured on a solution of 0.1 gm. of the polymer in 100 cc. of chloroform at 20° C., of 12.6 (Resin A).

A similar polymer again containing 10% by weight (8.9% molar) of ethyl acrylate but having a reduced specific viscosity of 2.3 was also prepared (Resin B).

Formation of blend with vinyl chloride polymer

Four sheets, each $\frac{1}{16}''$ thick and having the formulations set out in Table 1 were made by compounding the appropriate ingredients on a two roll mill for 8 minutes at 150/140° C., calendering the compound to give foils 0.012–0.015 inch thick and finally pressing five foils together at about 170° C. to give rigid sheets of the required thickness.

TABLE 1

|  | Sheet | | | |
|---|---|---|---|---|
|  | 1 | 2 | 3 | 4 |
| Polyvinyl chloride ("Corvic" H55/34) | 100 | 100 | 100 | 100 |
| White lead paste | 5 | 5 | 5 | 5 |
| Calcium Stearate | 1.5 | 1.5 | 1.5 | 1.5 |
| Titanium dioxide | 15 | 15 | 15 | 15 |
| Resin A | 0 | 0 | 1 | 0 |
| Resin B | 0 | 1 | 0 | 3 |

There was no noticeable difference between the behaviour of formulation 1 and formulation 2 on the mill and the calender but with formulation 3, there was a reduction in edge-tearing, air-streaking was minimised and the surface gloss and general quality of the foil obtained were much increased. The temperature required for laminating the foils of formulation 3 was also reduced, being about 12° C. lower than that required for formulations 1 and 2.

Formulation 4 was of similar composition to formulation 2 but contained an additional two parts of Resin B. The behaviour of this formulation approached that of formulation 3.

In pact strengths of all four formulations, as measured by the falling weight test (described in PLC/31, the Draft British Standard for Rigid PVC Sheet, Part 1: Pressed Sheet), were approximately the same.

EXAMPLE 2

One sheet formed for each formulation of Example 1 was shaped into an 8 inch diameter dome by blow moulding for 1 minute at about 120° C. The results were as set out in Table 2.

TABLE 2

| Sheet | Blowing pressure required | Comments |
|---|---|---|
| 1 | 16 lb./sq. inch | Reversion occured with loss of gloss and slight pinhole tearing. |
| 2 | 14 lb./sq. inch | |
| 3 | 13 lb./sq. inch | No reversion occurred and gloss was retained. |
| 4 | 10 lb./sq. inch | Very slight pinhole tearing. |

The experiment was repeated using a blowing time of 2 minutes and a temperature of about 145° C. and the results are set out in Table 3.

TABLE 3

| Sheet | Blowing pressure required | Comments |
|---|---|---|
| 1 | 9 lb./sq. inch | Reversion and severe pinhole tearing occurred. |
| 2 | 9 lb./sq. inch | |
| 3 | 5 lb./sq. inch | Slight reversion occurred but gloss was quite good and there was only slight pinhole tearing. |
| 4 | 9 lb./sq. inch | |

EXAMPLE 3

One sheet formed from each formulation of Example 1 was press-formed into a dish using a heating cycle of 90 seconds per side at a temperature of about 125° C. Sheets 1 and 2 showed reversion and one whole side was torn but in sheets 3 and 4 there was only slight reversion and very slight pinhole tearing and the products were glossy.

EXAMPLE 4

One sheet formed from each formulation of Example 1 was vacuum formed into a tray using a 52 second cycle at about 125° C. Sheets 1 and 2 showed reversion and had only a fair degree of gloss retention while sheets 3 and 4 showed only very slight reversion and had good gloss retention.

The forming operation was repeated using a 62 second cycle at about 150° C. and sheets 1 and 2 showed heavy reversion and completely lost their gloss; severe tearing also occurred. In sheets 3 and 4 there was only slight reversion and slight loss of gloss with very slight tearing occurring.

EXAMPLE 5

Two acrylic copolymer resins each containing 90% by weight of methyl methacrylate and 10% (8.9% molar) of ethyl acrylate were manufactured using the process described in Example 1.

Resin C was obtained by polymerisation at 45° C. and had a reduced viscosity of 13.6.

Resin D was obtained by polymerisation at 65° C. and in the presence of 0.015 part of lauryl mercaptan as chain transfer agent. This resin had a reduced specific viscosity of 4.7.

The latices of both polymers were separately coagulated with a 1% solution of aluminium sulphate, filtered and tray-dried.

Three formulations were made up from the ingredients itemised in Table 4.

TABLE 4

| Formulation | 5 | 6 | 7 |
|---|---|---|---|
| Polyvinyl chloride "Corvic" D55/9 | 100 | 100 | 100 |
| Tribasic lead sulphate paste | 4 | 4 | 4 |
| Glyceryl mono-oleate | 2 | 2 | 2 |
| Calcium stearate | 0.75 | 0.75 | 0.75 |
| Resin C | 0 | 0 | 3 |
| Resin D | 0 | 3 | 0 |

Injection moulding compounds were formed from these formulations by mixing the ingredients on a Banbury mixer to a temperature of 160° C. and then on a two roll mill for five minutes at 145/135° C.

The compounds were injection moulded on standard equipment to give rigid 40 mm. T-piece pipe fittings. The mouldings formed from compound 5 were of poor quality, showing bad surface finish over an extensive area round the gate of the mould. Compound 6 gave mouldings whose surface quality was superior to those given by compound 5 over a wide range of injection moulding conditions. Compound 7, however, gave results considerably superior to those of compound 6, the area of poor quality surface finish of the moulding being reduced to a minimum for a wide range of injection moulding conditions and eliminated completely in some cases.

A formulation similar to that of compound 7 but containing only 1 part of Resin C was formed into an injection moulding compound composition and the moulding obtained from it were comparable in quality to those given by compound 6.

EXAMPLE 6

Two acrylic resins were manufactured using the process described in Example 1 but at 70° C.

Resin E was manufactured using 28.5 parts of methyl methacrylate and 1.5 parts ethyl acrylate to give a copolymer containing 95% by weight of methyl methacrylate and 5% (4.4% molar) of ethyl acrylate and having a reduced viscosity of 6.2.

Resin F was manufactured using 30 parts of methyl methacrylate to give a homopolymer of methyl methacrylate with a reduced specific viscosity of 7.3.

Clear rigid polymer compounds were produced from each of the formulations set out in Table 5 by Banbury mixing followed by working on a two roll mill.

TABLE 5

| Formulation | 8 | 9 | 10 |
|---|---|---|---|
| Polyvinyl chloride "Corvic" D55/9 | 100 | 100 | 100 |
| Dibutyltin dinonylthiodiglycollate | 3 | 3 | 3 |
| Glyceryl monostearate | 2 | 2 | 2 |
| Stearic acid | 0.5 | 0.5 | 0.5 |
| Resin E | 0 | 3 | 0 |
| Resin F | 0 | 0 | 3 |

The compounds were injection moulded to give 40 mm. T-piece pipe fittings. Compounds 8 and 9 gave clear homogeneous mouldings but compound 10 gave mouldings showing a few discrete particles of undispersed Resin F. Thus, for ease of dispersion under processing conditions normal for polyvinyl chloride, it is preferred that the acrylic resin is a copolymer rather than a homopolymer.

EXAMPLE 7

Five acrylic resins having the formulae set out in Table 6 were manufactured by polymerising methyl methacrylate alone and with varying amounts of ethyl acrylate by the process described in Example 1, using as catalyst 0.05% by weight of potassium persulphate, based on the total weight of polymerisable monomer.

TABLE 6

| Resin | Percent of Ethyl Acrylate in Copolymer | | Reduced Specific Viscosity of Copolymer |
|---|---|---|---|
| | Weight | Molar | |
| G | 0 | 0 | 18.9 |
| H | 5 | 4.4 | 18.8 |
| J | 10 | 8.9 | 18.5 |
| K | 15 | 13.5 | 16.2 |
| L | 20 | 18.0 | 16.7 |

2 parts of each of these resins were blended with 100 parts of polyvinyl chloride, 2½ parts of an organo-tin heat stabiliser, 2 parts of stearyl alcohol and 0.5 part of cetyl palmitate on a Banbury mixer and the blends were worked up on a two-roll mill.

It was found that the clarity of the blends was increased with increase in the amount of comonomer in the blend indicating that the addition of comonomer improved the ease with which the resin could be dispersed in the polyvinyl chloride. On the other hand, articles moulded from blends containing Resins G and H showed excellent surface finish while articles moulded from the blend containing Resin J showed a small area of poor surface finish round the gate of the mould. This area showed an increase in the moulding from the blend containing Resin K and a further increase in the moulding from the blend containing Resin L thus showing that increase in the comonomer content of the acrylic resin decreases the effectiveness of the resin as a processing aid.

EXAMPLE 8

Three moulding compositions were formed from the formulations set out in Table 7 below by mixing the ingredients in a Banbury mixer and then working the blend on a two-roll mill.

TABLE 7

| Formulation | 11 | 12 | 13 |
|---|---|---|---|
| Polyvinyl chloride "Corvic" D55/9 | 100 | 100 | 100 |
| Organo-tin stabilizer | 2.5 | 2.5 | 2.5 |
| Stearyl alcohol | 2 | 2 | 2 |
| Cetyl palmitate | 0.5 | 0.5 | 0.5 |
| Resin M | 3 | 0 | 0 |
| Resin N | 0 | 1.5 | 0 |
| Resin O | 0 | 0 | 1 |

Each resin was a copolymer of methyl methacrylate and ethyl acrylate containing 10% by weight (8.9% molar) of ethyl acrylate. Resin M had a reduced specific viscosity of 2.5, Resin N had a reduced specific viscosity of 10 and Resin O had a reduced specific viscosity of 18.

40 mm. T-piece pipe fittings moulded from each formulation were all of a similar quality, demonstrating the increase in effectiveness of the acrylic additives with increase in reduced viscosity.

EXAMPLE 9

The polymerisation process of Example 1 was repeated using 27 parts of methyl methacrylate, 3 parts of n-butyl acrylate, 0.015 part of potassium persulphate and a polymerisation temperature of 50° C. to give a copolymer which had a reduced specific viscosity of 13.25 and contained 10. by weight (7.3% molar) of n-butyl acrylate.

3 parts of the copolymer were blended with 100 parts of "Corvic" D55/9, 2 parts of an organo-tin stabiliser, 2 parts of stearyl alcohol and 0.5 part of cetyl palmitate on a Banbury mixer and the blend was worked up on a two-roll mill.

The composition was injection moulding to give an article of fair surface finish. By way of comparison, a similar composition using 3 parts of Resin C (Example 5) in place of the methyl methacrylate/n-butyl acrylate copolymer was injection moulded to give an article of good surface finish.

EXAMPLE 10

This is a comparative example to show the effect of addition of plasticizer.

Vinyl chloride was polymerised by the aqueous suspension process in an autoclave and just before the pressure in the autoclave was vented to atmosphere pressure, an aqueous dispersing containing a copolymer of methyl methacrylate (90%) and ethyl acrylate (10%) having a reduced specific viscosity of 15 was introduced into the autoclave. The contents of the autoclave were stirred, excess pressure vented to atmospheric pressure and dried to give an "acrylic modified" vinyl chloride polymer of K-value 55. The amount of copolymer dispersion used was such that the final vinyl chloride polymer contained 3% of the acrylic copolymer.

For comparative purposes an unmodified vinyl chloride polymer of K-value 55 was prepared by a similar process, but omitting the addition of the acrylic copolymer dispersion.

100 parts of each vinyl chloride polymers were tumble blended with 3.5 parts of Mellite 31 (a sulphur containing organo-tin stabiliser), 1 part of ethyl palmitate and 0.5 part of dimethylol propane distearate. (The latter two components are lubricants.) Various quantities of a plasticizer (DAP; a dialkyl phthalate made from a mixture of alcohols containing from 7 to 9 carbon atoms) were mixed in the cold with the composition and then the mixture milled on a two roll mill, one roll of which was maintained at 145° C., the other roll beaing maintained at 150° C., for 5 minutes. The time for the composition to gel to form a continuous homogeneous crêpe was observed as a guide to the relative processabilities of the polymer composition.

The results are shown in Table 8.

TABLE 8

| Plasticizer content | | Time to gel (seconds) | |
|---|---|---|---|
| Parts used | Percent of composition | Acrylic modified polymer | Unmodified polymer |
| 0 | 0 | 90 | 120 |
| 4 | 3.7 | 45 | 120 |
| 8 | 7.1 | 30 | 30 |
| 20 | 16.0 | 15 | 15 |

These results show that the "acrylic modified" polymers containing 0 and 4 parts of plasticizer have a marked improvement in processability compared with the unmodified polymer. The results also show that addition of larger quantities of plasticizer (8 and 20 parts) also has an effect on processability, overriding any improvement given by the acrylic modifier.

The crêpes were then pressed at 180° C. into sheets of thickness 0.125 inch. The sheets made from compositions containing 4 and 8 parts of plasticizer were rigid whereas those made from compositions containing 20 parts of plasticizer were on the borderline between rigid and flexible, and were not suitable for rigid applications.

The softening points of the sheets were measured according to the Vicat test (British Standard 2782 Method 102D). The results are quoted in Table 9.

TABLE 9

| Plasticizer content | | Vicat Softening Point, ° C. | |
|---|---|---|---|
| Parts used | Percent of composition | Acrylic modified polymer | Unmodified polymer |
| 0 | 0 | 80 | 82 |
| 4 | 3.7 | 71.5 | 72 |
| 8 | 7.1 | 66 | 66.5 |
| 20 | 16.0 | 53 | 53.5 |

This shows that the addition of even small amounts of plasticizer has a considerable lowering effect on the softening point of the composition. There is little difference, however, between the softening points of the acrylic modified and unmodified compositions containing equal amounts of plasticizer. Thus the use of the acrylic modifier has little or no effect on softening point.

We claim:

1. A rigid, essentially unplasticized solvent free thermoplastic polymeric composition comprising a polymer of at least 80% vinyl chloride, and at least 0.1% and up to 5% by weight of the vinyl chloride polymer of an acrylic polymer which is a polymer of methyl methacrylate with from 0 to 25% molar of an alkyl acrylate in which the alkyl group contains from 1 to 10 carbon atoms and which has a reduced specific viscosity measured on a solution of 0.1 gm. of the polymer in 100 cc. of chloroform at 20° C. of at least 4.5, said composition containing less than 5% by weight of a plasticizer.

2. A composition according to claim 1 which contains from 1 to 3% by weight of the acrylic polymer, based on the weight of the vinyl chloride polymer.

3. A composition according to claim 1 in which the acrylic polymer has a reduced specific viscosity of at least 7.

4. A composition according to claim 2 in which the acrylic polymer has a reduced specific viscosity of at least 10.

5. A composition according to claim 1 in which the alkyl group of the alkyl acrylate contains from 1 to 4 carbon atoms.

6. A composition according to claim 5 in which the acrylic polymer is a copolymer containing from 5 to 15% by weight of the alkyl acrylate.

7. A composition according to claim 6 in which the alkyl acrylate is ethyl acrylate.

8. A composition according to claim 7 comprising 100 parts of a polymer of vinyl chloride and from 1 to 3 parts of a copolymer of from 90 to 95% by weight of methyl methacrylate and from 10 to 5% by weight of ethyl acrylate, said copolymer having a reduced specific viscosity of at least 10.

References Cited

UNITED STATES PATENTS

| 2,311,249 | 2/1943 | Powell | 260—899 |
| 2,366,414 | 1/1945 | Lindh | 260—899 |
| 2,397,942 | 4/1946 | Brookman et al. | 260—899 |
| 3,251,904 | 5/1966 | Souder et al. | 260—885 |
| 3,316,192 | 4/1967 | Seibel | 260—23 |
| 3,284,545 | 11/1966 | Cenci et al. | 260—899 |

FOREIGN PATENTS

| 237,020 | 8/1959 | Australia. |
| 1,371,413 | 7/1964 | France. |

MURRAY TILLMAN, *Primary Examiner.*

SAMUEL H. BLECH, *Examiner.*

J. WHITE, *Assistant Examiner.*